July 18, 1961    R. SWALLOW    2,992,649
AUTOMOBILE COVER
Filed July 14, 1958    3 Sheets-Sheet 1
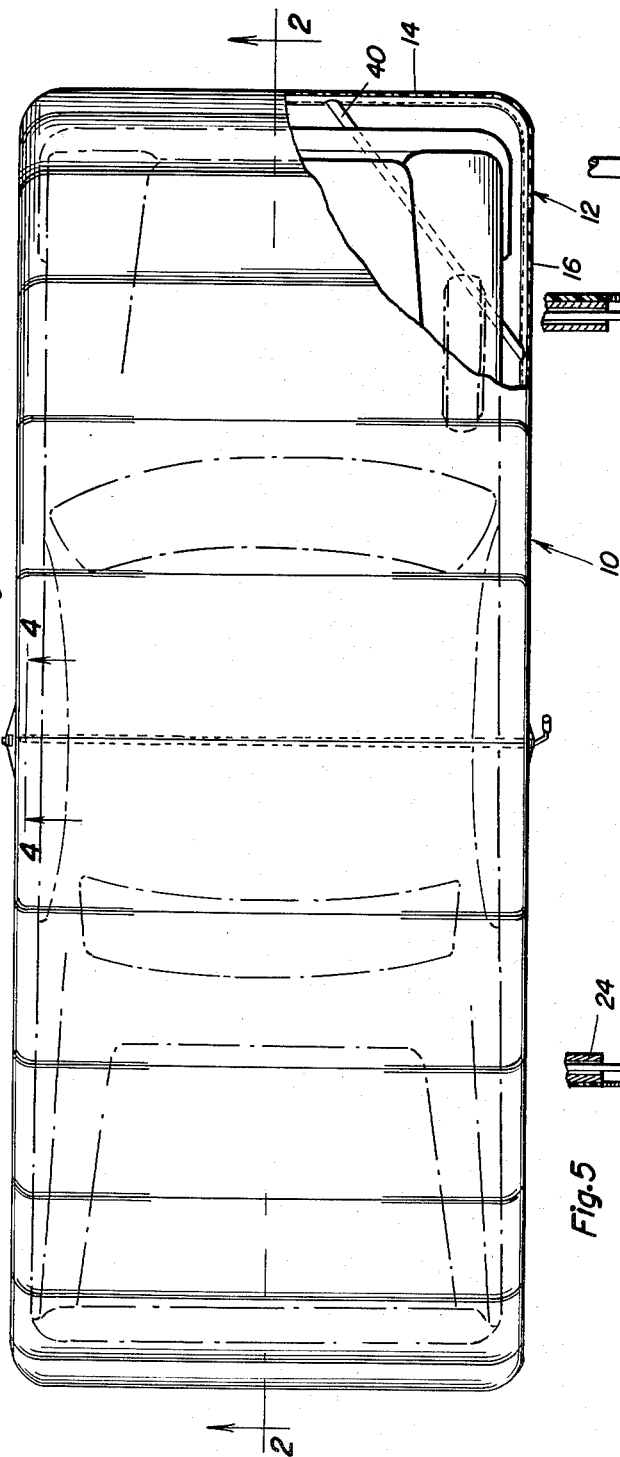
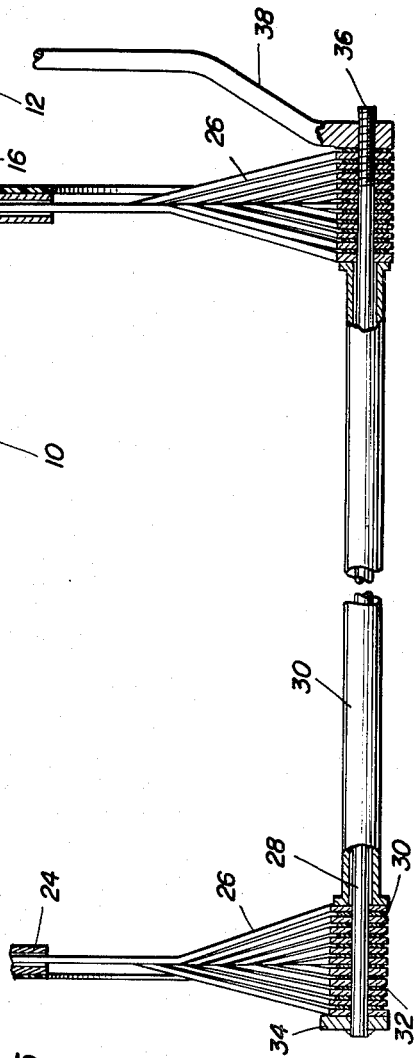
Roland Swallow
INVENTOR.
BY *Clarence A. O'Brien*
and *Harvey B. Jackson*
Attorneys July 18, 1961 R. SWALLOW 2,992,649
AUTOMOBILE COVER
Filed July 14, 1958 3 Sheets-Sheet 2
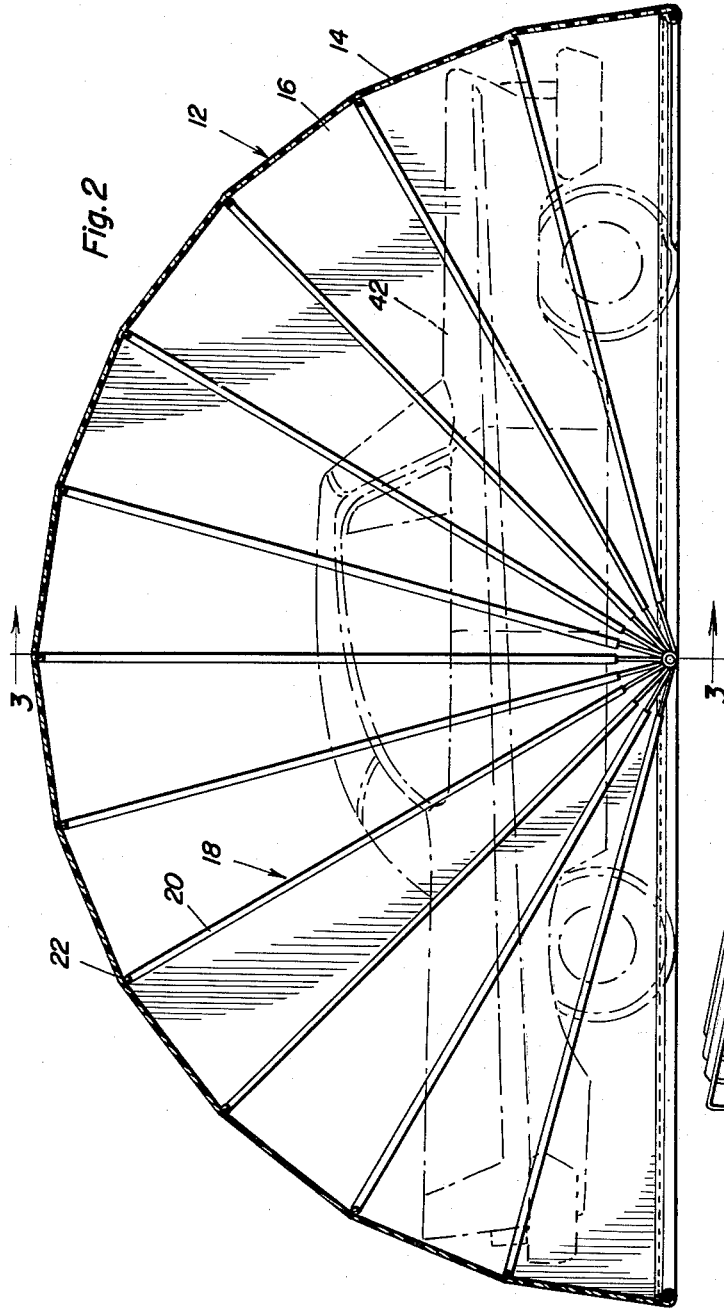
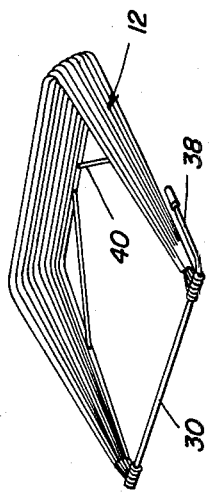
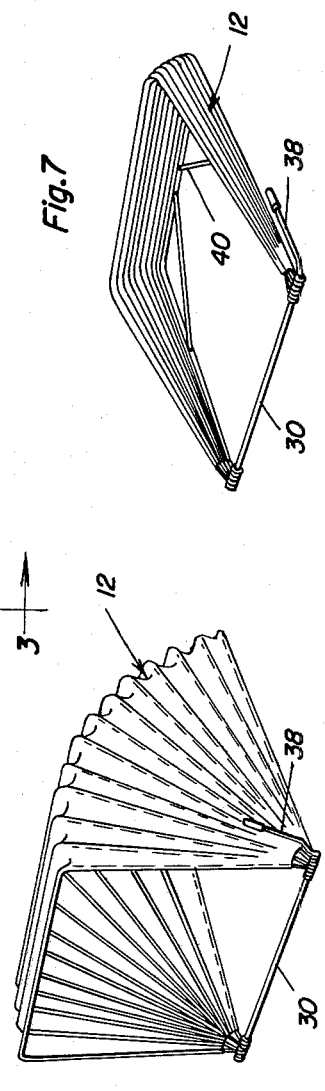
Roland Swallow INVENTOR.

July 18, 1961 R. SWALLOW 2,992,649
AUTOMOBILE COVER
Filed July 14, 1958 3 Sheets-Sheet 3
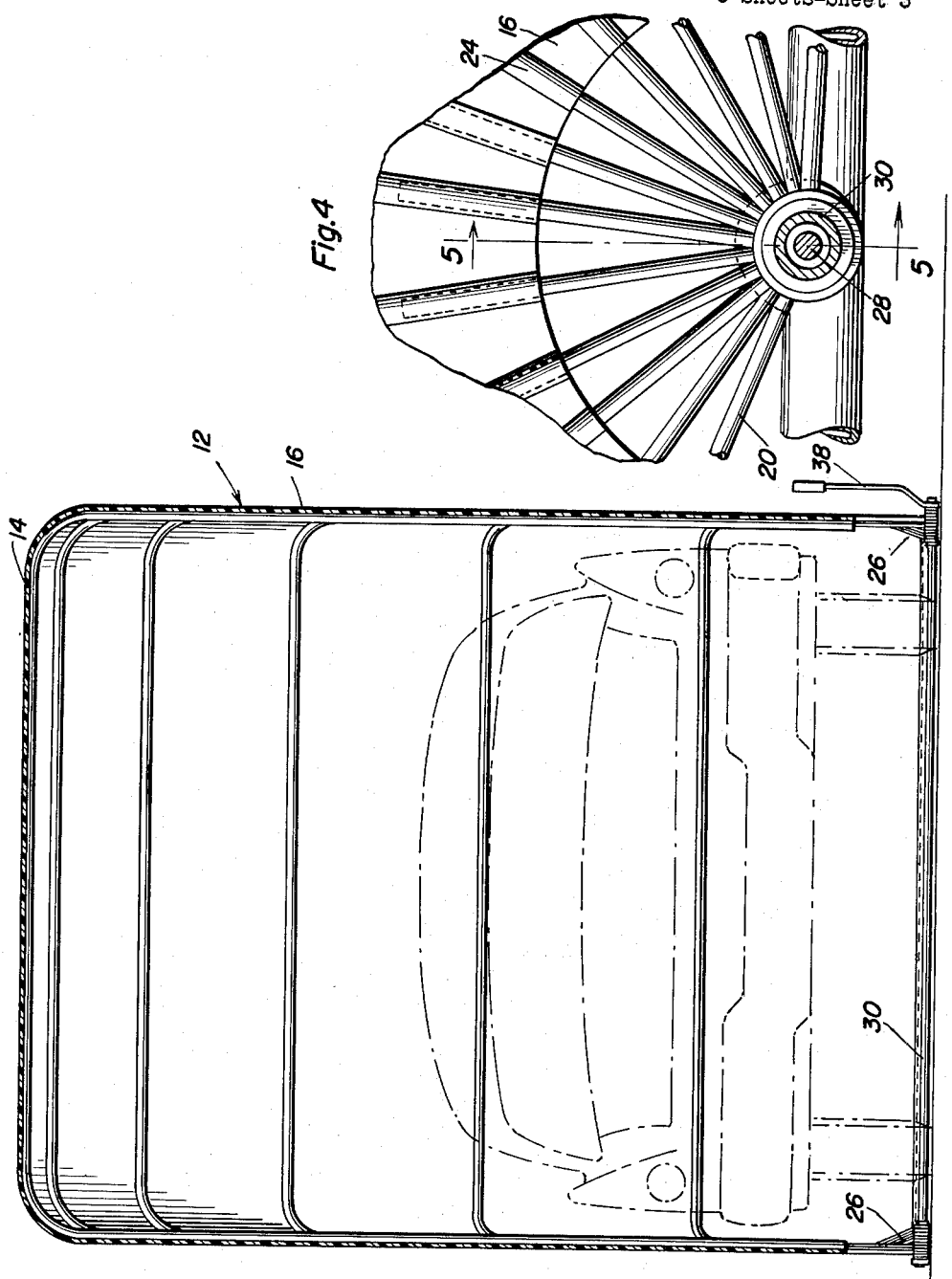
Roland Swallow INVENTOR.
BY *Clarence A. O'Brien*
*and Harvey B. Jacobson*
Attorneys

United States Patent Office

2,992,649
Patented July 18, 1961

2,992,649
AUTOMOBILE COVER
Roland Swallow, 67 Montee Ste. Marie, Ste. Anne de Bellevue, Quebec, Canada, assignor of one-half to Mary E. Swallow, Ste. Anne de Bellevue, Quebec, Canada
Filed July 14, 1958, Ser. No. 748,353
5 Claims. (Cl. 135—1)

The present invention generally relates to a covering device and more particularly to an automobile cover in the form of an enclosure for the automobile which may be easily collapsed and set up in extended condition.

In many places, there is no garage provided for a person's automobile in that a permanent garage is relatively expensive. Inasmuch as it is desirable to enclose the automobile for protecting the same from various weather conditions and for other reasons, it is the primary object of the present invention to provide a tent-like covering or harbor which completely covers the car and has a lower edge engaging the ground surface and generally being semi-cylindrical in transverse as well as longitudinal configuration and being completely foldable from an operative position to an inoperative position for enabling automobiles to be driven into or out of the cover.

Another object of the present invention is to provide an automobile cover in accordance with the preceding objects in which a novel locking means is provided for locking the cover in extended or retracted position as well as in partially extended condition in which the device has various utilities such as use as a tent, for storage purposes, covering farm equipment in order to protect the same from various detrimental weather conditions.

Another important object of the present invention is to provide an automobile cover in accordance with the preceding objects in which the construction is extremely simple, easy to use, capable of performing many results and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the automobile cover of the present invention with portions of the corner thereof broken away illustrating the structural details;

FIGURE 2 is a longitudinal, vertical sectional view taken substantially upon a plane passing along section line 2—2 of FIGURE 1 illustrating the details of construction of the cover;

FIGURE 3 is a transverse, vertical sectional view taken substantially upon a plane passing along section line 3—3 of FIGURE 2;

FIGURE 4 is a detailed sectional view taken substantially upon a plane passing along section line 4—4 of FIGURE 1;

FIGURE 5 is a detailed sectional view taken substantially upon a plane passing along section line 5—5 of FIGURE 4 illustrating the details of construction of the block mechanism for the U-shaped bows;

FIGURE 6 is a perspective view illustrating the device in partially opened condition; and FIGURE 7 is a perspective view of the device in fully opened position.

Referring now specifically to the drawings, the numeral 10 generally designates the automobile cover, canopy or harbor of the present invention which includes in its construction an enlarged canvas cover 12 which includes a peripheral wall 14 and side walls 16 with the side walls 16 being generally semi-circular in shape as illustrated in FIGURE 2 with the peripheral wall 14 being generally semi-cylindrical in shape. Connected to the interior surface of the cover 12 is a plurality of U-shaped bows generally designated by the numeral 18 and including parallel leg portions 20 and bight portion 22. The bight portion 22 and the major portion of the legs 20 are received in sleeves or hems 24 on the peripheral wall 14 and side walls 16 respectively of the cover 12 thus mounting the U-shaped bows 18 in spaced relation on the interior surface of the cover 12.

The free ends of the leg portions 20 are offset as designated by the numeral 26 and are pivotally received on a transverse shaft 28. The transverse shaft 28 has a spacer plate 30 mounted thereon and extending between the inner surfaces of the inner offset free ends of the legs 20. The offset free ends terminate in circular plates 30 and may be disposed in spaced relation by friction disks 32. Welded to one end of the rod 28 is a block 34 rigid with the outermost offset end portion 26 for fixing the rod 28 thereto. The other end of the rod or shaft 28 is screw threaded as indicated by the numeral 36 and threadedly receives an apertured handle 38 which has an offset portion and which is disposed alongside of the cover 12 so that by rotation of the handle 38, the handle 38 will move longitudinally on the shaft 28 thus causing compression of the friction disk 32 and the mounting plates 30 for locking the bows 18 in angular spaced relation. This enables the bows 18 to be completely folded to the condition illustrated in FIGURE 7 for ease of storage and also for permitting automobiles to enter the cover by driving over the spacer tube 30 with this construction being shown in FIGURE 7 and the partially opened construction shown in FIGURE 6 which also enables automobiles to be driven into and out of the cover.

Extending angularly across the corner of the outermost or lowermost bow 18 at one end of the cover are rods 40 which are adapted to be engaged by the vehicle wheels thus anchoring the entire assembly to the earth for preventing accidental movement thereof. The device is of such a size that it will readily accommodate a vehicle 42 but may be used as a tent or as a storage area and may be even used on the beach as a protection against the sun rays. When no car is disposed in the cover, the same may be left flat as shown in FIGURE 7 or in partially opened condition. Further, the cover may be of canvas material but is preferably foil insulated plastic which not only helps to protect the vehicle but also keeps the same warm and free from snow and ice during the wintertime. If desired, some means may be provided on the part of the invention to mount the same or secure the same to the ground surface.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cover device comprising a generally semi-cylindrical hollow cover, and a framework for retaining the cover in extended position and providing for folding of the cover to a compact condition for ease of removing an automotive vehicle or driving a vehicle into the area normally enclosed by the cover, and means for frictionally holding the cover in angularly adjusted position, said framework including a plurality of U-shaped bows each including spaced legs connected by a bight portion and having the free ends of the legs offset and mounted axially on a common transverse shaft, said shaft having a spacer thereon engaging the free end of the leg portion of the innermost U-shaped bow, and screw thread means on said shaft for reducing the effective length thereof thereby increasing the frictional drag between the leg portions, a pair of rods fixed to a lowermost bow angularly positioned between said legs and said bight portion adapted to be held between the wheels of the vehicle and the ground, each of said bows being provided with a circular apertured plate mounted on said shaft, friction discs on said shaft interposed between said circular plates, one end of said shaft being fixed to one end of said bows, and a screw threaded handle means on the other end of said shaft for changing the effective length for selectively releasing and frictionally holding the bows in angularly adjusted position.

2. The combination of claim 1 wherein said bows are secured to the cover along the bight portion and the major portion of the legs thereof.

3. A cover device comprising a generally semi-cylindrical hollow cover, a collapsible framework movable between an extended and a folded position, said cover secured to said framework, and means for locking said framework and attached cover in an angularly adjusted position, said framework including a plurality of U-shaped bows each defining a bight portion and a pair of spaced leg portions, the free ends of said leg portions being offset and provided with circular apertured plates mounted axially on a common transverse shaft, said shaft having a spacer thereon engaging the free end of the leg portions of the innermost U-shaped bow, and screw thread means on said shaft for reducing the effective length thereof thereby increasing the frictional drag between the free ends of the leg portions, and friction discs on said shaft interposed between said circular plates.

4. The combination of claim 3 wherein a pair of rods are fixed to a lowermost bow angularly extending between said legs and said bight portion.

5. The combination of claim 3 wherein said bows are secured to the cover along the bight portion and the major portion of the legs thereof.

References Cited in the file of this patent

UNITED STATES PATENTS

| | | |
|---|---|---|
| 1,015,347 | Schnaus | Jan. 23, 1912 |
| 2,598,940 | Robie | June 3, 1952 |
| 2,798,501 | Oliver | July 9, 1957 |

FOREIGN PATENTS

| | | |
|---|---|---|
| 154,846 | Sweden | June 12, 1956 |
| 773,113 | France | Aug. 27, 1934 |